(12) United States Patent
Schliesser et al.

(10) Patent No.: US 9,017,151 B2
(45) Date of Patent: Apr. 28, 2015

(54) FILLING MACHINE

(71) Applicant: Albert Handtmann Maschinenfabrik Gmbh & Co. KG, Biberach (DE)

(72) Inventors: Gerhard Schliesser, Baustetten (DE); Andreas Betz, Wain (DE); Manfred Baechtle, Schemmerhofen (DE); Florian Osswald, Ulm (DE); Robert Winghart, Oberstadion (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 0 days.

(21) Appl. No.: 14/140,106

(22) Filed: Dec. 24, 2013

(65) Prior Publication Data

US 2014/0213162 A1    Jul. 31, 2014

(30) Foreign Application Priority Data

Jan. 25, 2013    (DE) .......................... 10 2013 201 229

(51) Int. Cl.
*A22C 11/00* (2006.01)
*A22C 11/02* (2006.01)

(52) U.S. Cl.
CPC ............. *A22C 11/02* (2013.01); *A22C 11/0209* (2013.01)

(58) Field of Classification Search
USPC ...................................................... 452/21–51
See application file for complete search history.

(56) References Cited

U.S. PATENT DOCUMENTS

| 5,273,482 | A | | 12/1993 | Beckman et al. |
| 5,499,578 | A | * | 3/1996 | Payne .............................. 99/537 |
| 7,220,176 | B2 | * | 5/2007 | Hartwick ........................ 452/30 |
| 2007/0098862 | A1 | | 5/2007 | Hansen et al. |

FOREIGN PATENT DOCUMENTS

| DE | 19916582 A1 | 10/2000 |
| EP | 2016830 A1 | 1/2009 |
| EP | 2468106 A1 | 6/2012 |
| WO | WO-03101208 A1 | 12/2003 |
| WO | WO-2013041165 A1 | 3/2013 |

OTHER PUBLICATIONS

Search Report for EP 13195063.6, dated Jun. 10, 2014.
Search report for DE 102013201229.2, dated Nov. 11, 2013.

* cited by examiner

*Primary Examiner* — Richard Price, Jr.
(74) *Attorney, Agent, or Firm* — Marshall, Gerstein & Borun LLP

(57) ABSTRACT

A filling machine for sausages, having a filling tube and a unit for removing a filling material plait exiting the filling tube end during a filling process interruption, where the removing unit includes a separator element by means of which the filling material plait can be removed when a relative movement is executed between the filling tube end and the separator element, the separator element including at least one filling material adhesion surface to which filling material is transferable and adherable, and the adhesion surface has associated therewith a cleaning device.

22 Claims, 2 Drawing Sheets

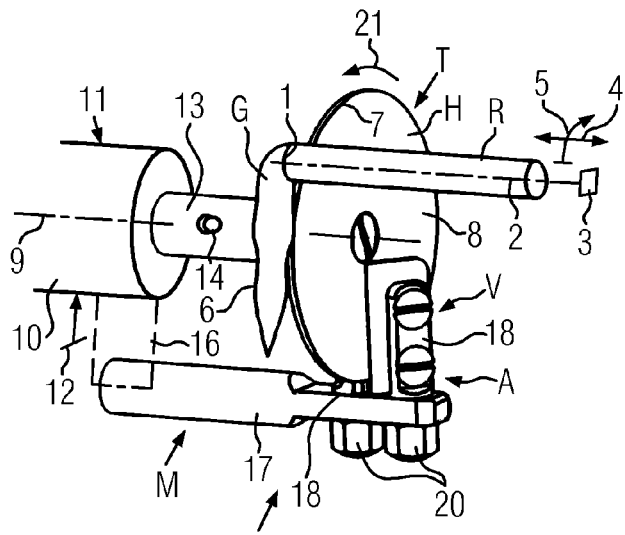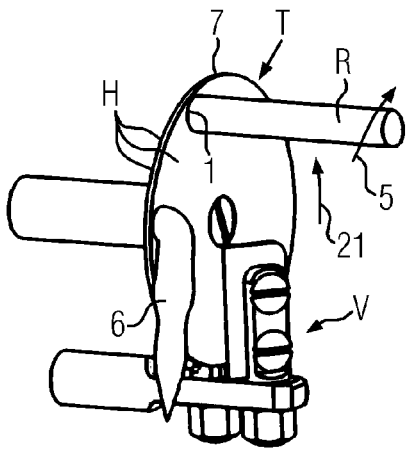
FIG. 1  FIG. 2
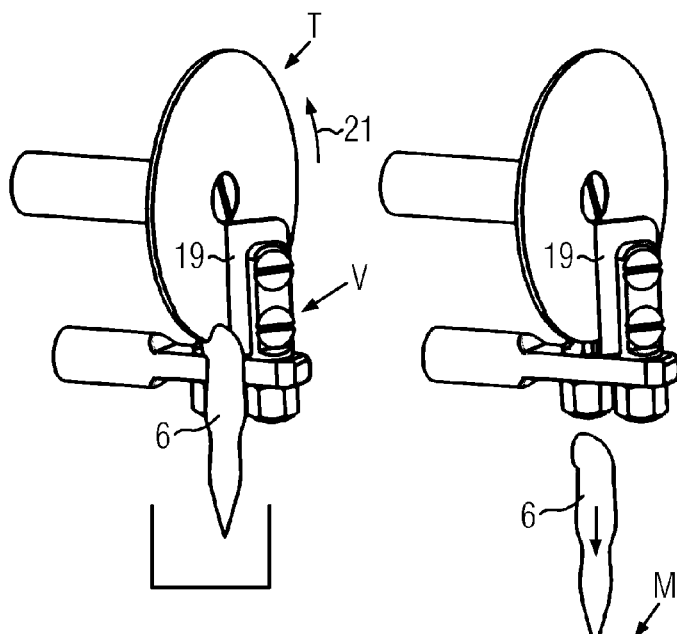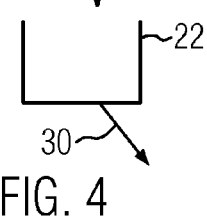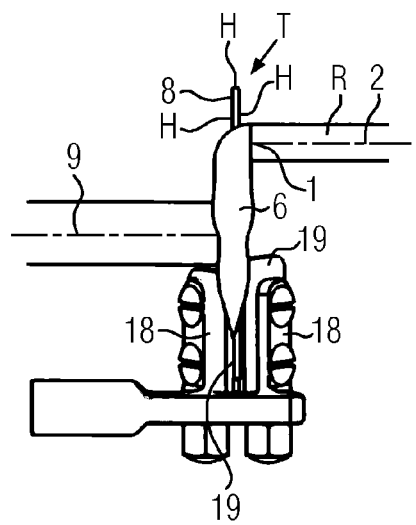
FIG. 3  FIG. 4  FIG. 5

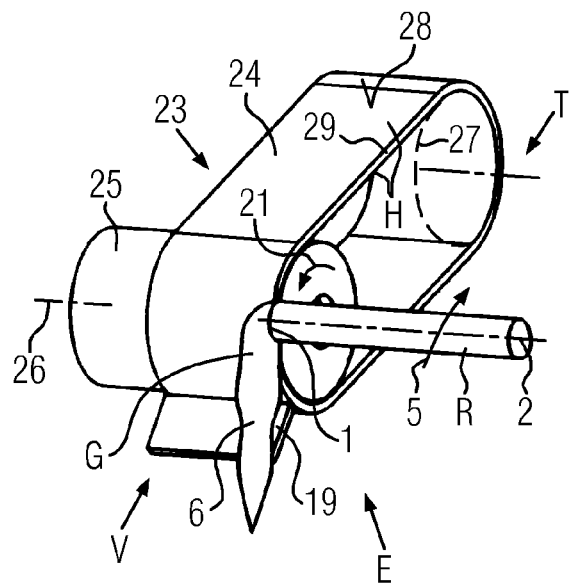
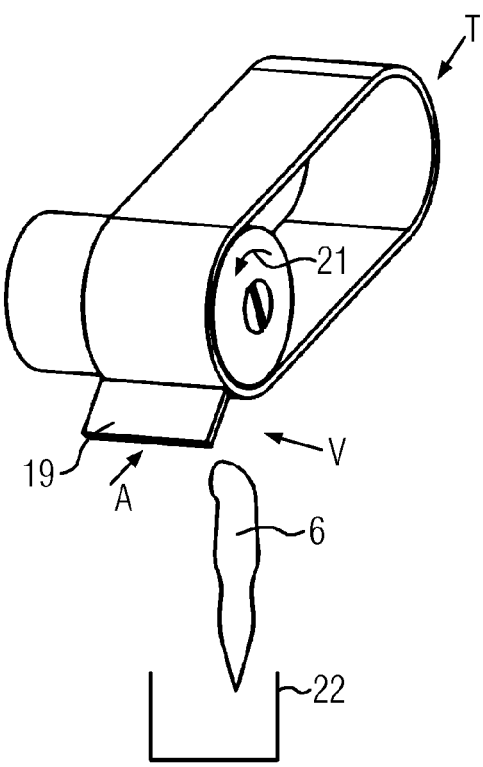
FIG. 6
FIG. 7
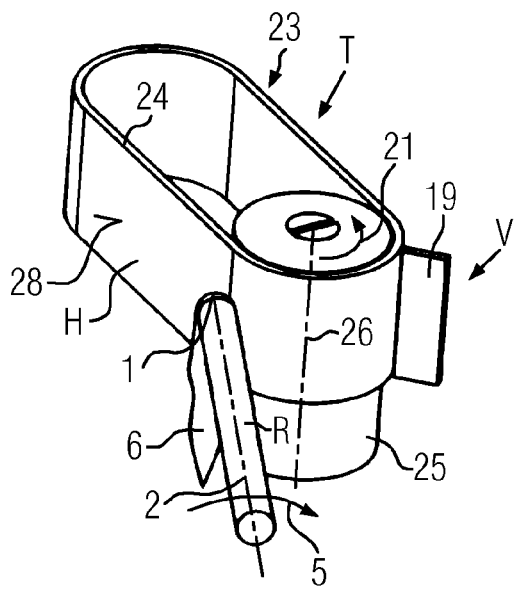
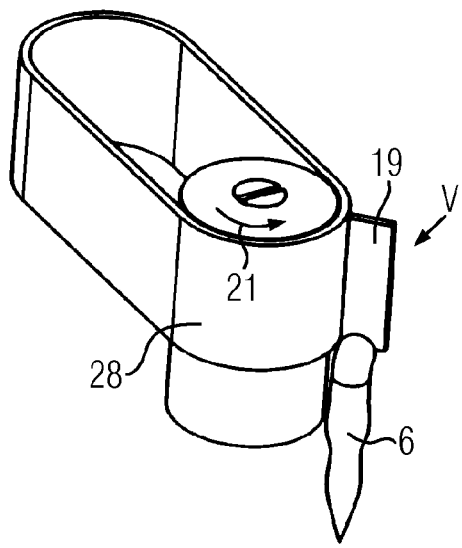
FIG. 8
FIG. 9

FILLING MACHINE

CROSS-REFERENCE TO RELATED APPLICATION

The present application claims the benefit of priority of German Application No. 10 2013 201 229.2, filed Jan. 25, 2013. The priority application is incorporated herein by reference in its entirety.

FIELD OF THE DISCLOSURE

The disclosure relates to a filling machine for food products, such as for sausage.

BACKGROUND

When filling material is filled into sausage casings, the filling material is ejected from the filling tube end under pressure and is compressed in the entire conveying area from the filling pump to the filling tube end. If the filling process is interrupted, e.g. for pulling a new ruffled casing onto the filling tube, the filling material contained in the filling tube relaxes also due to an air content of approx. 0.5 to 12%. Since the filling material can only relax in one direction, viz. through the filling tube end, filling material will exit from the filling tube end, possibly also due to the viscosity of the filling material. Depending on its consistency, said filling material forms a kind of filling material plait or drop, which will first hang down from the filling tube end. Due to the force of gravity and/or movements of the filling tube in the filling machine, the filling material plait finally drops, adheres at unforeseeable points to the machine, which becomes more and more dirty, and/or contaminates ruffled casings which are to be pulled on. Some ruffled casings are very sensitive to externally adhering filling material and moisture penetrating into the respective casing from said filling material. This may result in malfunctions, such as bursting of the casing and weight fluctuations during filling processes.

Filling machines are known, in which, inter alia for these reasons, at least one wiper element is used, which, in a relative movement between the filling tube end and the wiper element, wipes off the filling material plait and casts it away in a normally uncontrolled manner unless it does not initially adhere to it. Cast-away filling material contaminates the filling machine and may contaminate ruffled casings to be pulled on. Filling material that adhered to the wiper element may perhaps be reapplied to a filling tube or the filling tube during the next wiping process and is thus transferred to new ruffled casings to be pulled on.

SUMMARY OF THE DISCLOSURE

It is one aspect of the present disclosure to provide a filling machine of the type referred to at the beginning, in the case of which functional and/or operational disorder caused by filling material plaits is/are reliably avoided.

The filling material removed by the separator element from the filling tube end during the relative movement will adhere to the adhesion surface which is intentionally provided on the separator element for this purpose. The cleaning device associated with the adhesion surface cleans e.g. afterwards the adhesion surface by removing the filling material adhering thereto, so that for a subsequent transfer of filling material either a clean part of the adhesion surface can be used or the adhesion surface will be clean again and take over the filling material plait so as to free the respective filling tube end or the filling tube. A filling tube to be cleaned will always have a clean adhesion surface or adhesion surface subarea on the separator element at its disposal for transferring the filling material. The complete removal of the filling material from the filling tube takes place so to speak in two steps, viz. through the transfer to the separator element and through the cleaning of the separator element by the cleaning device.

According to an expedient embodiment, at least an adhesion surface subarea, which is intended to be used for the next filling material transfer, is cleaned in that the cleaning device removes the filling material therefrom as soon as the separator element has taken over a filling material plait. It is not necessary that the cleaning device immediately removes from the separator element a filling material plait adhering thereto, before another filling tube end with a new filling material plait arrives, provided that the adhesion surface is large enough for allowing the use of a clean subarea which is intended for the next filling material transfer. In this case, e.g. a plurality of filling material plaits may be present on the separator element simultaneously, which are then successively removed by the cleaning device. This provides a time buffer for cleaning It will also be expedient when the cleaning device is arranged stationarily in the unit and defines a filling material detachment area which is locally determined in the filling machine, preferably a dripping area oriented towards a collecting means located therebelow. The cleaning device has here an additional function, since, on the one hand, it removes from the adhesion surface filling material adhering thereto and, on the other hand, it does not distribute the filling material over the filling machine in an uncontrolled manner during cleaning, but makes it drip precisely in the direction where a collecting means is provided, so that the filling machine will not be contaminated and so that the risk of contaminating e.g. ruffled casings which are to be pulled on or which have already been pulled on will be excluded.

According to an expedient embodiment, the cleaning device is arranged in the unit outside the path of the relative movement taking place between the filling tube end and the separator element so as to transfer a filling material plait to the separator element. The separator element and/or the adhesion surface is/are connected to a motion drive with which the adhesion surface can be moved past the cleaning device, preferably continuously or possibly also incrementally and/or forwards and backwards. The separator element takes the filling material plait over from a filling tube and conveys it to the cleaning device, which will then remove the filling material plait, in such a way that there will be no contact between the filling material and the filling tube which continues to move and the filling tube or some other filling tube will have a clean adhesion surface at its disposal during the next transfer.

The cleaning effect produced when the adhesion surface is being cleaned will be particularly intensive when the cleaning device includes at least one filling material wiper element, preferably a wiper blade made of metal or plastic material, or a wiper lip made of an elastomer or rubber, which is preferably in adjustable contact with the adhesion surface. The blade or lip peels the adhering filling material thoroughly off from the adhesion surface and conducts it to a location where it can drop or drip into a collecting means in a precisely localized manner. Also two or more blades or lips or a combination of a blade and a lip may be provided.

Fundamentally, it may be expedient when the separator element is stationarily supported in the filling machine and when the filling tube is adapted to be moved past the separator element by a motion drive. The reverse principle, i.e. to move the separator element past the filling tube end, or a combination of both movements, are, of course, imaginable as well.

The motion drive moving the filling tube relative to the separator element should expediently be a motion drive of the filling machine itself, which carries out steps between successive filling processes, e.g. displaces the filling tube between a unit for pulling on ruffled casings and a unique for filling the ruffled casings in the filling machine.

According to a particularly expedient embodiment, the separator element is a flat disk, which is adapted to be rotatably driven about a rotary axis by a rotary drive. The disk may be round, polygonal or segment-shaped. The disk is preferably made of metal such as stainless steel or of a plastic material, e.g. a detectable plastic material. The adhesion surface is defined by one surface or by both surfaces, possibly together with the disk edge. The plane of the disk extends at least approximately at right angles to the axis of the filling tube end, so that during the relative movement a filling material plait hanging down from the filling tube end will be taken over by the disk edge and at least one surface and will be held due to adhesion. The wiper element should be oriented approximately radially to the rotary axis and should preferably include at least one wiper blade or wiper lip associated with a surface of the disk. In the event that both surfaces of the disk are used as adhesion surfaces, each surface should have associated therewith at least one wiper blade or wiper lip.

For optimizing the cooperation between the separator element and the filling tube end, e.g. in accordance with the consistency or viscousness of the filling material, it will be expedient when the disk is displaceable in the direction of the rotary axis relative to the filling tube end.

According to an alternative embodiment, the separator element may be a flat disk of arbitrary shape, e.g. a disk made of metal or of a plastic material, which is adapted to be moved relative to the wiper element linearly to and fro by means of a linear drive, e.g. a pneumatic cylinder. This plate may be oriented at right angles to the axis of the filling tube.

According to a further embodiment, the separator element is configured as a flat endless conveyor belt. A metal, plastic or elastomer belt is driven by at least one drive roll. The outer surface of the conveyor belt defines, possibly together with at least one belt edge, e.g. the adhesion surface. The wiper element of the cleaning device extends transversely across the outer surface of the conveyor belt, preferably in the conveyor belt area supported by the drive roll, so that the conveyor belt cannot yield to a substantial extent during cleaning and the filling material can be peeled off thoroughly.

As regards the arrangement of the conveyor belt, e.g. two orientations will be expedient, the present disclosure being, however, not restricted to these orientations. The rotary axis of the drive roll extends, relative to the axis of the filling tube end, either at least approximately parallel or perpendicular. If it extends approximately parallel, e.g. the conveyor belt edge serves to wipe off the filling material plait from the filling tube end. If it extends, however, perpendicular to the axis of the filling tube, the filling material plait will be transferred directly onto the outer surface of the conveyor belt, which will then convey it towards the wiper element.

According to an expedient embodiment, the adhesion surface is configured or coated such that filling material will easily adhere thereto, so that adhesion will occur between the filling material plait and the adhesion surface, the adhesion surface being, however, nevertheless easy to clean.

The wiper blade or wiper lip, however, may be configured or coated such that filling material will not easily adhere thereto, so that the wiper blade or wiper lip will mechanically execute its cleaning function on the adhesion surface, but allow peeled-off filling material to drip of very easily.

According to an expedient embodiment, the separator element is made of stainless steel or of detectable plastic material. Stainless steel is, to a very large extent, insensitive to aggressive ingredients of the filling material and also to mechanical loads applied by the cleaning device. Detectable plastic material offers the advantage, e.g. because of the metal contained therein, that wiper parts which may have broken off and which might get into the product in the worst case can be detected and removed.

Finally, in accordance with an expedient embodiment, the unit or at least the separator element with the cleaning device is mounted in the filling machine such that it can be removed from or taken out of the path of movement of the filling tube, since there are filling materials, such as sausage meat used for making salami or other raw sausage meat, which are processed at comparatively low temperatures and have an almost solid consistency. Also the problem of expansion and exiting from the filling tube end in the case of filling process interruptions is here not serious. The mechanical resistance during transfer to the separator element may, however, increase to such an extent that this may lead to a deformation of a filling tube having a comparatively small diameter. For such sausage meat grades the whole unit or at least the separator element with the cleaning device can be removed or displaced, e.g. pivoted out of the way, so that it is inoperative when these sausage meat grades are being processed.

BRIEF DESCRIPTION OF THE DRAWINGS

Embodiments of the subject matter of the present disclosure are explained making reference to the drawings, in which:

FIG. 1 shows in a schematic and perspective view, a detail in a filling machine for sausages, in an operating phase in which the filling process is interrupted, FIG. 2 shows a view corresponding to that of FIG. 1 in a later operating phase, FIG. 3 shows a view corresponding to that of FIG. 1 in a still later operating phase, FIG. 4 shows a still later operating phase, FIG. 5 shows a side view of FIG. 1, FIG. 6 shows another embodiment of a detail in a filling machine for sausages, in an operating phase in which the filling process is interrupted, FIG. 7 shows a later operating phase of the embodiment according to FIG. 6, FIG. 8 shows another embodiment of a detail in a filling machine for sausages, in an operating phase in which the filling process is interrupted, and FIG. 9 shows a view corresponding to that of FIG. 8 in a later operating phase.

DETAILED DESCRIPTION OF THE PREFERRED EMBODIMENT

FIG. 1 shows a filling tube R with a filling tube end 1 and an axis 2 of the filling tube R and filling tube end 1 as parts of a filling machine M, which is not shown in detail. The filling tube R is connected to a motion drive 3, e.g. a motion drive of the filling machine M, which is capable of moving the filling tube e.g. in the directions indicated by the double arrows 4 and 5, the filling tube end 1 executing thus a movement relative to a unit E placed stationarily in the filling machine M. A plurality of filling tubes R may be provided on a turret, e.g. three filling tubes R, which are moved cyclically, one unit E being provided for these filling tubes in common or a respective unit E being provided for each of these filling tubes. The relative movement in the direction of arrow 5 takes place e.g. such that the filling tube end 1 moves past a separator element T of the unit E in very closely spaced relationship therewith, the filling tube end 1 passing an adhesion surface H of a separator element T in the course of this movement.

The reason for an interruption of the filling process in the filling machine M is e.g. that the filling tube R is cyclically moved from one unit for filling the ruffled casing to another unit for pulling on a ruffled casing (not shown). During a filling process, the filling material G is ejected under pressure by a filling pump of the filling machine through the filling tube end 1 and, in the course of this process, it is compressed between the filling tube end and the filling pump. During the filling process interruption, the filling material contained in the filling tube relaxes, e.g. due to an air content of approx. 0.5 to 12%, so that a filling material plait or drop 6 consisting of the filling material will form on the filling tube end 1, possibly also due to the viscosity of the material, said filling material plait or drop hanging down from the filling tube end 1.

The unit E is e.g. stationarily mounted in the filling machine and is primarily used for transferring during the relative movement between the filling tube R and the separator element T the filling material plait 6 to the separator element T and removing it thus from the filling tube end 1, so that the filling machine M and/or a ruffled casing (not shown) to be pulled onto the filling tube R will not be contaminated. In addition, the unit E includes a cleaning device V for the separator element T.

In a filling machine (not shown), in which the filling tube moves only axially, this movement is used as a relative movement and/or also the unit E or the separator element T is moved by a motion drive, e.g. when the filling tube R does not execute any movement at all in the filling machine M.

In the embodiments of unit E shown in FIG. 1 to FIG. 5, the separator element T is a circular flat disk 8 with a disk edge 7, said disk 8 being adapted to be rotatably driven by a rotary drive 10 and the drive shaft 13 of said rotary drive, respectively. The rotary drive 10 may be supported at 11, and it may possibly be supported such that, as indicated near 12, it can be removed from the filling machine M or at least be moved out of the path of movement of the filling tube R when the unit is to be put out of operation. It is also possible to remove or displace the separator element T alone (with or without the cleaning device V).

As indicated near 14, the disk 8, which is here positioned perpendicular to the axis 2 of the filling tube R, can be displaced in the direction of the rotary axis 9 so as to optimize the distance at which the filling tube end 1 moves past the disk 8, when the filling tube R executes the movement in the direction of the arrow 5.

The disk 8 defines for the filling material plait 6 an adhesion surface H comprising e.g. one or both surfaces of the disk 8 and possibly also the disk edge 7. The direction of rotation of the disk 8 is indicated by arrow 21. It will be expedient to execute the rotation continuously, but it may also be executed incrementally and/or forwards and backwards.

In the embodiment shown in FIG. 1, the disk 8 is made e.g. of a metal, such as stainless steel, or of a plastic material, such as a detectable plastic material. The disk 8 is screw-fastened to the drive shaft 13 by means of a screw 15 and can thus be replaced by some other disk, e.g. for the purpose of adaptation to various kinds of filling materials or in the case of damage.

A holder 17 is positioned in the unit E or on the rotary drive 10 via a support 16, said holder 17 having mounted thereon a wiper element A, which is part of the cleaning device V associated with the separator element T and the adhesion surface H, respectively. In the embodiment shown in FIG. 1 to FIG. 5, the wiper element A is at least one wiper blade and/or wiper lip 19 associated with a surface of the disk and directed approximately radially to the rotary axis 9. The wiper blades or lips 19 are here mounted on holders 18, which, in turn, are adjustably secured in position on the holder 17 by means of fastening nuts 20. The wiper blades or wiper lips 19 may consist of metal, such as stainless steel, or of a plastic material or of an elastomer or of rubber. The wiper lip may also comprise only a lip insert on a stable carrier. Polyurethane or POM are plastic material grades which are well suited for producing wiper blades or wiper lips 19. Stainless steel may, however, be used as well. The respective combination of materials 19/T is chosen depending on the material of the separator element T, among other parameters.

FIG. 1 illustrates an operating phase in which the filling tube R is moved in the direction of arrow 5 towards the separator element T but has not yet reached the latter.

FIG. 2 illustrates a later operating phase in which the filling tube R moves past the adhesion surface H with its filling tube end 1, the filling material plait 6 having, however, already been transferred to the adhesion surface H and adhering to and hanging down from said adhesion surface H. The disk 8 has been advanced a certain distance counterclockwise from the position according to FIG. 1, so that the filling material plait 6 adhering to the adhesion surface H approaches the cleaning device.

In FIG. 3 the filling material plait 6 has arrived at the cleaning device V and has been peeled off by at least one wiper blade 19 and is just on the point of dropping. The filling tube R has already fully passed the separator element and can be reincorporated into a filling process.

FIG. 4 illustrates in a later operating phase how the filling material plait 6 peeled off by the wiper blade 19 drops, due to the force of gravity, down into a collecting means 22 from which a discharge means 30 may lead away.

Due to the position of the cleaning device V on the holder 17 and in the unit E, a predetermined detachment position for transferred filling material plaits 6 is determined in the filling machine M. This detachment position should expediently be chosen such that dropping filling material plaits will contaminate neither any filling tube nor other components of the filling machine nor ruffled casings which are to be pulled on or which have already been pulled on.

FIG. 5 illustrates the operating phase of FIG. 1 in a side view. The plane of the disk 8 extends approximately perpendicular to the axis 2 of the filling tube R, so that the rotary axis 9 and the axis 2 extend approximately parallel to but in displaced relationship with one another. The passing filling tube end 1 is closely spaced to the surface of the disk 8. Wiper blades 19 are associated with both surfaces of the disk 8 and contact these surfaces, e.g. in line or area contact therewith. When it is guaranteed that only one surface of the disk 8 is, possibly together with the disk edge 7, used as an adhesion surface H, the wiper blade 19 only extends up to this surface. Furthermore, the same surface of the disk may have associated therewith a plurality of wiper blades and/or wiper lips 19.

The embodiment of unit E in FIG. 6 and FIG. 7 differs from that according to FIG. 1 to FIG. 5 insofar as the separator element T is configured after the fashion of an endless conveyor belt 23. A flat metal or plastic belt 24 runs around a drive roll 25 and possibly a free-running roll 27 and is driven in the direction of arrow 21. The outer surface 28 of the conveyor belt 23 serves, possibly together with the belt edge 29, as adhesion surface H for filling material plaits 6. The filling tube end 1 is moved past the separator element T and the belt edge 29, respectively, e.g. in the direction of arrow 5. In this case, preferably the belt edge 29 serves to wipe off the filling material plait 6 adhering after the transfer e.g. also to the outer surface 28. The rotary axis 26 of the drive roll 25 extends at least approximately parallel to the axis 2 of the filling tube R. The outer surface 28 of the conveyor belt 23 has stationarily associated therewith at least one wiper blade or wiper lip 19 of the cleaning device V, expediently such that a sweeping contact is obtained. The adhering filling material plait 6 is conveyed to this point and taken off, whereupon it drops. It will be expedient to arrange the wiper blade or wiper lip 19 in a deflection area of the conveyor belt 23 at the location where the belt 24 is supported, so that it cannot yield during cleaning FIG. 7 illustrates a later operating phase in which the filling tube R has moved past the separator element T, while, acting as the wiper element A, the wiper blade or wiper lip 19 has peeled the filling material plait 6 off from the adhesion surface H, and lets it then drop into the collecting means 22.

In a further embodiment, which is not shown, the separator element may be a flat plate of metal or plastic material positioned approximately at right angles to the axis 2 of the filling tube R and having an arbitrary contour, said plate being moved to and fro by a linear drive relative to the cleaning device so as to remove each transferred filling material plait 6 by the cleaning device V from the adhesion surface and make it drop.

The embodiment shown in FIG. 8 and FIG. 9 is similar to that according to FIG. 6, since a conveyor belt 23 is used, whose outer surface 28 has associated therewith the at least one wiper blade or wiper lip 19 of the cleaning device V. However, in FIG. 8 and FIG. 9, the rotary axis 26 of the drive roll 25 is oriented at least approximately at right angles to the axis 2 of the filling tube R, and it is mainly the outer surface 28 of the conveyor belt 23 that serves substantially as an adhesion surface H for the respective filling material plait 6.

In FIG. 8 the filling tube R is just on the point of passing with its filling tube end 1 e.g. the deflection area of the conveyor belt 23 at the outer surface 28 thereof. The filling tube end 1 has not yet reached the separator element T.

In the operating phase according to FIG. 9, the filling tube end 1 has transferred the filling material plait 6 to the outer surface 28 of the conveyor belt 23 and moved on, whereas the adhering filling material plait 6 (arrow 21) is conveyed to the wiper blade or wiper lip 19 of the cleaning device V and detached, whereupon it drops.

The cleaning device V may be modified such that, if the disk edge 7 or the belt edge 29 is used as part of the adhesion surface H of the separator element T, filling material G that may adhere to said disk edge 7 or belt edge 29 is also removed therefrom.

In the case of a filling tube R that is not moved in the direction of arrow 5, as in the embodiment shown, but possibly only in the direction of the axis 2, the unit E or at least the separator element T may be moved relative to the filling tube end 1, so as to transfer a filling material plait 6 to the adhesion surface H, said filling material plait 6 being then removed from the adhesion surface H by the cleaning device V and disposed of in a controlled manner. In this case, the unit E or the separator element T may move relative to the stationary cleaning device V, which utilizes this relative movement for the purpose of cleaning.

The invention claimed is:

1. A filling machine for sausages, comprising at least one filling tube, from an exposed filling tube end of which filling material exits during a filling process, at least one removing unit for removing filling material exiting the filling tube end at least during a filling process interruption, wherein the at least one removing unit includes at least a separator element and a path of a relative movement can be generated between the filling tube end and the separator element, the separator element comprising a filling material adhesion surface to which filling material that has been removed from the filling tube end is transferable and adherable, and a cleaning device for removing filling material from the adhesion surface.

2. The filling machine according to claim 1, further comprising at least an adhesion surface subarea, which is intended to be used for the next filling material removal step, and can be cleaned by removing therefrom adhering filling material.

3. The filling machine according to claim 1, wherein the cleaning device is arranged stationarily in the at least one removing unit, and defines a filling material detachment area which is locally determined in the filling machine.

4. The filling machine according to claim 3, wherein the filling material detachment area comprises a dripping area oriented towards a collecting means.

5. The filling machine according to claim 1, wherein the cleaning device is arranged in the at least one removing unit outside the path of the relative movement, and one of the separator element, the adhesion surface, and a combination thereof is connected to a motion drive with which the adhesion surface can be moved past the cleaning device.

6. The filling machine according to claim 5, wherein the connection to a drive is in a continuous mode.

7. The filling machine according to claim 1, wherein the cleaning device includes at least one filling material wiper element.

8. The filling machine according to claim 7, wherein the separator element is a flat disk, which is adapted to be rotatably driven about a rotary axis by a rotary drive, whose one or both surface(s), which is/are positioned approximately at right angles to the axis of the filling tube end, define, together with a disk edge, the adhesion surface, and that the wiper element is oriented approximately radially to the rotary axis and includes at least one of a wiper blade or wiper lip associated with at least one surface.

9. The filling machine according to claim 8, wherein the disk is displaceable at least in the direction of the rotary axis and relative to the path of movement of the filling tube end.

10. The filling machine according to claim 7, wherein the separator element is a flat disk, which is adapted to be moved linearly to and fro relative to the wiper element.

11. The filling machine according to claim 10, wherein the wiper element comprises one of a wiper blade or wiper lip and is configured or coated such that filling material will not easily adhere thereto.

12. The filling machine according to claim 10, wherein the flat disk is made of metal or a plastic material.

13. The filling machine according to claim 7, wherein the wiper element comprises one of a wiper blade made of one of metal or plastic, and a wiper lip made of one of an elastomer or rubber, and a combination thereof.

14. The filling machine according to claim 7, wherein the wiper element is in adjustable contact with the adhesion surface.

15. The filling machine according to claim 1, wherein the separator element is stationarily supported in the filling machine, and wherein the filling tube with the filling tube end is adapted to be moved by a drive past the separator element.

16. The filling machine according to claim 15, wherein the filling tube is moved by the drive of the filling machine carrying out steps between successive filling processes.

17. The filling machine according to claim 1, wherein the separator element comprises a belt made of one of a group including metal, plastic, and elastomer, the belt being an endless conveyor belt, which is adapted to be driven by at least one drive roll and an outer surface of which defines, together with a belt edge, the adhesion surface, and wherein a wiper element of the cleaning device extends at least transversely across the outer surface of the conveyer belt.

18. The filling machine according to claim 17, wherein the rotary axis of the drive roll is oriented relative to the axis of the filling tube end either at least approximately parallel or perpendicular thereto.

19. The filling machine according to claim 17, wherein the wiper element extends at least transversely across the outer surface of the conveyor belt in the area where the conveyor belt is supported by the drive roll.

20. The filling machine according to claim 1, wherein the adhesion surface is configured or coated such that filling material will easily adhere thereto.

21. The filling machine according to claim 1, wherein the separator element is made of stainless steel or of detectable plastic material.

22. The filling machine according to claim 1, wherein the at least one removing unit is mounted in the filling machine such that it can be removed from or taken out of the path of movement of the filling tube.

\* \* \* \* \*